March 13, 1956  R. T. CASEY  2,738,444
PANELBOARD CONSTRUCTION
Filed Dec. 8, 1951
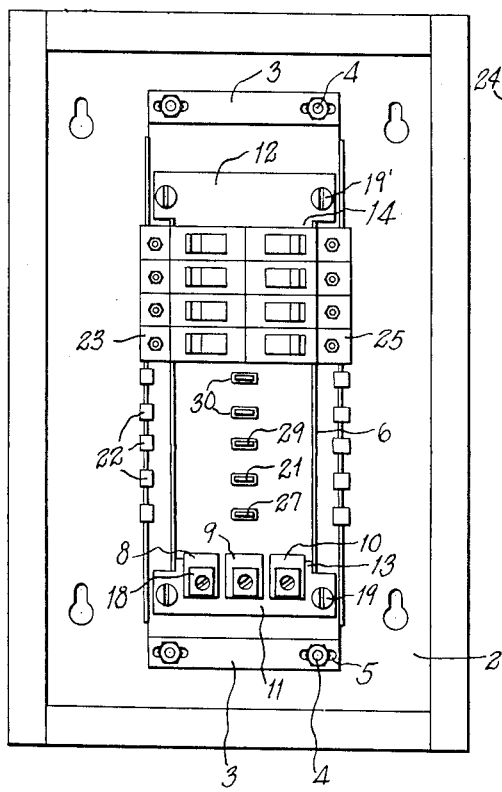
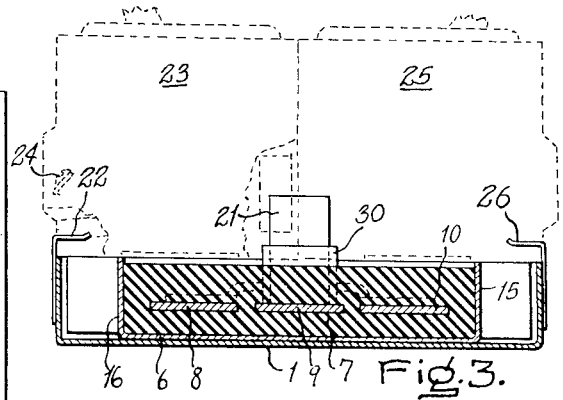
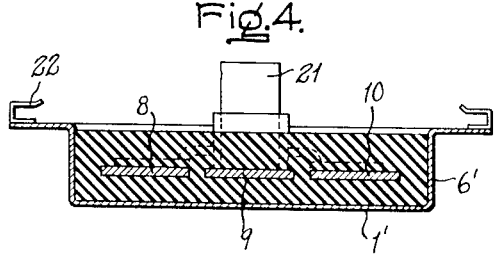
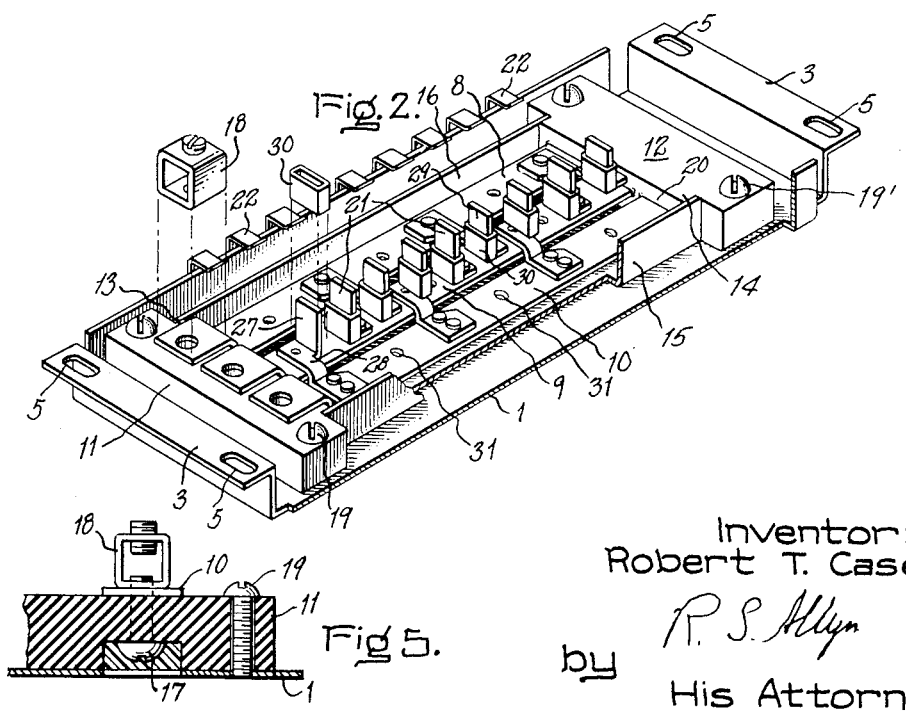
Inventor:
Robert T. Casey,
R. S. Allyn
by
His Attorney.

United States Patent Office 2,738,444
Patented Mar. 13, 1956

2,738,444

PANELBOARD CONSTRUCTION

Robert T. Casey, Bristol, Conn., assignor to General Electric Company, a corporation of New York Application December 8, 1951, Serial No. 260,616

6 Claims. (Cl. 317—119)

My invention relates to electric load centers, panelboards or the like for use in electric lighting and power distribution systems, and more particularly to the mounting of the bus bars on panelboards.

More particularly this invention relates to panelboards including a plurality of bus bars embedded in an insulating base and provided with exposed main line terminals at one end and exposed load or branch terminal blades arranged in a single row or column upon which control units are adapted to be mounted, such as described and claimed in copending application Serial No. 274,749, filed by William J. Fleming on March 4, 1952, assigned to the same assignee as the present invention and which is a continuation-in-part of application Serial No. 184,759 filed September 14, 1950, and now abandoned and in copending application Serial No. 273,473 filed by Herman J. Hammerly et al. on February 26, 1952, assigned to the same assignee as the present invention and which is a continuation of application Serial No. 184,086 filed September 9, 1950, and now abandoned.

In producing the panelboard of the prior application, the bus bars are mounted in a special fixture and immersed in a liquid plastic composition in a mold which is then baked for a time to set the plastic and forming a base of permanent form from which the terminals project after which the fixture is detached and the base is removed from the mold and mounted in a suitable support. The control units are adapted to be interlocked with hooks along the margins of the support and connected to the branch circuit terminals.

It is the main object of my present invention to improve, simplify and reinforce the construction and to simplify and make flexible the manufacture by eliminating the mold as such and the fixture for holding the bus bars. This I accomplish by means of a specially designed control unit support which acts as a mold as well as a fixture to properly space and position the bus bars. I accordingly provide a support and holder in the form of a trough-shaped tray which constitutes a permanent part of the finished panelboard construction. The ends of the holder are formed by separate insulating blocks or cross bars which serve as supports for the ends of the bus bars. The holder thus constitutes a part of the bus bar support and is mounted directly in the supporting member. The liquid plastic composition is poured into the holder with the bus bars in supported relation so as to completely enclose the bus bars, leaving the line terminals and the branch circuit terminal blades exposed. The composition is then heated to form an insulating base within the holder.

The accompanying drawing illustrates two forms of the invention.

Fig. 1 is a front view of a panelboard construction embodying one form of my invention mounted in a conventional form of cabinet and in which provision is made for eighteen control units arranged in two columns of nine each but showing only eight control units installed.

Fig. 2 is an enlarged fragmentary perspective view of the panelboard of Fig. 1 showing the arrangement of the bus bars and associated parts.

Fig. 3 is a transverse sectional view of the panelboard showing two circuit breaker control units in dotted lines.

Fig. 4 is a transverse sectional view showing a modification of the panelboard construction.

Fig. 5 is a fragmentary transverse sectional view showing the mounting of one end of a bus bar.

The support 1 is formed usually of metal in the shape of a trough and adapted to be mounted in a cabinet 2 of any suitable form. In the form shown in Fig. 1, each end of the support is provided with an upturned and outwardly-turned flange 3 which is secured in the cabinet by bolts such as 4 which pass through holes 5 in the flanges.

The tray or holder body 6 for the base 7, made of a plastic electrically insulating material, has a trough-like shape and may be formed of metal or other suitable material and encloses a plurality of bus bars such as 8, 9 and 10 disposed in substantially parallel spaced relation in a common plane. The ends of the holder consist of two transverse bars 11 and 12 secured to the holder body 6 and which are preferably of insulating material and support the ends of the bus bars. The transverse bars 11 and 12 are provided with extensions such as 13 and 14, respectively, to extend into the ends of the tray where they are overlapped by the side walls 15 and 16. Each bus bar has at one end, i. e. the lefthand end as viewed in Fig. 2, an upwardly offset line terminal portion extending over and resting on the cross bar 11 and secured by a screw 17 which passes through the cross bar and said end of the bus bar and is screwed into the terminal lug 18 as shown in Fig. 5. Cross bar 11 is secured to the support 1 by a screw 19 at each end. Cross bar 12 is similarly secured to the support by a screw 19' at each end. The other end of each bus bar is set into a recess 20 in the cross bar 12 so that the bus bars are supported in fixed spaced relation by the two cross bars.

The ends of the tray may be extended beneath the cross bars 11 and 12 and the cross bars may be secured to these extended ends in a manner similar to the fastening of the cross bars and the support.

A number of branch circuit terminals or blades such as 21 are mounted on the center bus bar 9 in spaced aligned relation and project from the surface of the base. The support 1 is provided along its marginal edges with oppositely disposed hooks 22 and 26. One edge of a circuit breaker 23 or 25 or other control unit is adapted to be engaged beneath a hook 22 or 26 and tilted into the position shown in the drawing where its circuit terminal frictionally engages substantially one half of the exposed portion of the extending blade 21. Such a control unit may have a branch terminal 24.

The bus bar 10 is provided with spaced projecting terminal blades 27 which are connected to it by lateral conducting members 28 which are offset from the plane of the center bus bar 9.

Bus bar 8 is provided with similar projecting terminal blades 29. All of the terminal blades are arranged in a single column or row, each blade being preferably flat and extending in a plane at right angles to the plane of the bus bars. The hooks 22 and 26 are disposed in alignment with the blades.

In the form of panelboard shown in Fig. 1, arrangement is made for an installation of two columns or rows of control units such as 23 and 25 and the supporting member 1 is provided with hooks 22 and 26 along its opposite edges. This arrangement disclosed of the bus bars, branch terminal blades, and mounting hooks is described and claimed in the above-mentioned William J. Fleming application.

I also preferably provide each projecting blade with a tubular insulating sleeve 30 around its base to increase the over-surface spacing between adjacent blades. Each of the bus bars 8, 9 and 10 and each of the connectors such as 28 are preferably provided with perforations 31 to facilitate the flow of the liquid plastic material when casting the base. After the bus bars and blades are positioned, the liquid plastic material is poured into the holder and around the bus bars. Heat is then applied to cure the material to form the base 7 and embed the bus bars therein, as by placing the entire assembly in an oven.

The liquid insulating material for the base may be any suitable type, with a polyvinyl plastisol composition preferred.

The insulating sleeves 30 may be made of any suitable insulating material such as for instance a polyvinyl chloride which bonds firmly with plastisol on heating. As shown in Fig. 3 the sleeves 30 project upward above the base 7 for a predetermined short distance thereby to increase the over-surface spacing between adjacent branch terminal blades 21, 27 and 29.

In the form shown in Fig. 4, I have formed the holding tray 6' and the supporting member 1' as one-piece, with marginal flanges extending laterally and supporting hooks 22 and 26 on the flanges spaced apart from the center the proper distance to accommodate the control units.

It will be noted that my panelboard construction eliminates the need for a separate mold. Furthermore, no separate jig or fixture is needed to hold and properly space the bus bars. Physical handling, number of operations and initial cost and time to set up and manufacture are, therefore, reduced. The improved manufacture is more flexible, since special size and shape panelboards can be more readily made up.

I claim:

1. In a panelboard or the like, a trough-shaped support, a holder-tray in said support having side walls and insulating cross bars secured to said holder-tray serving as end walls closing the space between said end walls, one of said end bars having spaced recesses therein, an insulating base in the holder-tray, spaced bus bars embedded in said base with the ends exposed, branch terminal blades connected to said bus bars and positioned in spaced alignment in a single column and extending above the outer face of the base, one end of each bus bar having an extension supported by one of the end bars and secured thereto, the opposite end of each bus bar being disposed in one of the recesses in the other end bar, and spaced hooks along the marginal edges of the support in transverse alignment with the blades for detachably supporting control units on the support.

2. In a panelboard or the like, an elongated channel-shaped holder provided with side walls and with end walls of electrically insulating material forming a mold having an open side for receiving and retaining a quantity of plastic insulating material, a plurality of generally flat bus bars supported in said holder, and extending lengthwise of said holder in spaced apart substantially parallel relation and in substantially parallel relation to the bottom of said tray, mechanical connections between one of said end walls and one end of each of said bus bars for supporting said ends, an upwardly offset line terminal portion on the opposite end of each of said bus bars extending over the other of said end walls for supporting said opposite ends of said bus bars, a mechanical connection between each of said terminal portions and said other end wall, at least one branch terminal on each of said bus bars projecting upward above the side walls of said holder, and a base of plastic insulating material substantially filling said holder and embedding said bus bars.

3. In a panelboard or the like, a generally channel-shaped holder having side walls and open ends, insulating end bars closing said open ends and extending partly within said holder, bus bars each having a line end supported on and positioned by one of said end bars and a second end positioned by the other of said end bars, said holder being substantially filled with a homogeneous plastic insulating compound, and said bus bars being provided with offset terminal portions projecting from said insulating compound and from the open side of said channel-shaped holder at spaced points along their length.

4. In a panelboard, the combination comprising a metal tray of substantially U-shaped cross section, an insulating member positioned at each end of said tray and cooperating with the side walls thereof to form a mold, a plurality of flat bus bars extending between said insulating members and positioned thereby in mutually insulated relation and in insulated relation with respect to said tray, a plurality of conducting terminals connected with and supported from said bus bars and extending from the open side of said tray in a column along the length of said tray, and a body of insulating material filling said tray and embedding said bus bars.

5. In a panelboard, the combination comprising a metal tray of substantially U-shaped cross section, an insulating member positioned and secured at each end of said tray and cooperating with the side walls thereof to form a mold, a plurality of flat bus bars extending between said insulating members and positioned thereby in mutually insulated relation and in insulated relation with respect to said tray, a plurality of conducting terminals connected with and supported from said bus bars and arranged in a column along the length of said tray, a body of insulating material filling said tray and embedding said bus bars, and means providing hooks along opposite side edges of said tray for supporting control units in engagement with said terminals.

6. In a panelboard, the combination comprising a metal tray of substantially U-shaped cross section, an insulating member positioned at each end of said tray and cooperating with the side walls thereof to form a mold, a plurality of flat bus bars extending between said insulating members and positioned thereby in mutually insulated relation and in insulated relation with respect to said tray, a plurality of conducting terminal blades connected with and supported from said bus bars and arranged in a column along the length of said tray, a body of insulating material filling said tray and embedding said bus bars, and a supporting enclosure for said tray including means providing hooks along opposite side edges of said tray for supporting control units in engagement with said terminal blades.

References Cited in the file of this patent

UNITED STATES PATENTS

| Number | Name | Date |
| --- | --- | --- |
| 1,203,582 | Chase | Nov. 7, 1916 |
| 1,333,004 | Vaughn | Mar. 9, 1920 |
| 2,351,942 | Dyer | June 30, 1944 |
| 2,428,322 | Robertson | Sept. 30, 1947 |
| 2,439,326 | Wilson | Apr. 6, 1948 |
| 2,440,824 | Jackson | May 4, 1948 |
| 2,470,066 | Calabrese | May 10, 1949 |
| 2,511,436 | Kauth | June 13, 1950 |
| 2,530,548 | Stanley | Nov. 21, 1950 |
| 2,590,821 | Kiser | Mar. 25, 1952 |
| 2,632,039 | Hammerly | Mar. 17, 1953 |

OTHER REFERENCES

TEB—14 NLTQ Bulletin: Panelboards; Trumbull Electric Mfg. Co., April 23, 1951, fifteen (15) pages.